G. M. BARTLETT.
FLEXIBLE SHAFT COUPLING.
APPLICATION FILED JAN. 18, 1908.

898,423.

Patented Sept. 15, 1908.

Witnesses
H. J. Goulding.
F. R. Finch.

Geo. M. Bartlett.

UNITED STATES PATENT OFFICE.

GEORGE MILLER BARTLETT, OF ANN ARBOR, MICHIGAN.

FLEXIBLE SHAFT-COUPLING.

No. 898,423.

Specification of Letters Patent.

Patented Sept. 15, 1908.

Application filed January 18, 1908. Serial No. 411,514.

*To all whom it may concern:*

Be it known that I, GEORGE MILLER BARTLETT, a citizen of the United States, residing at 1321 Wilmot street, in the city of Ann Arbor, county of Washtenaw, and State of Michigan, have invented a new and useful Flexible Shaft-Coupling, of which the following is a specification.

My invention relates to improvements in flexible shaft-couplings designed to transmit rotary motion between two shafts whose center-lines intersect, and the angle between whose center-lines may change while the shafts are in motion.

The objects of my improvement are, first, to insure a uniform angular velocity ratio between the driving shaft and the driven shaft; second, to accomplish this by means of a single joint instead of two joints connected by an intermediate shaft; third, to provide a means of automatically keeping the shaft ends in the proper relationship to one another while the angle between the shafts changes, and fourth, to insure that the velocity ratio between the two shafts remains unaltered while the angular relationship between the shafts is changing. I attain these objects by the mechanism illustrated in the accompanying drawing, in which—

Figure 1:
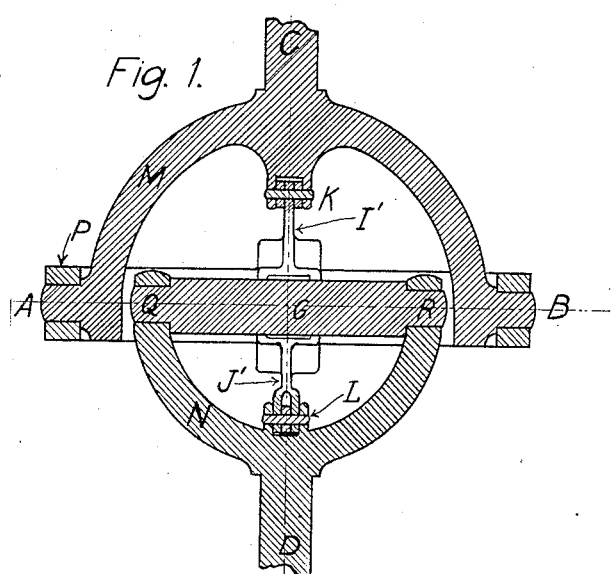
Figure 2:
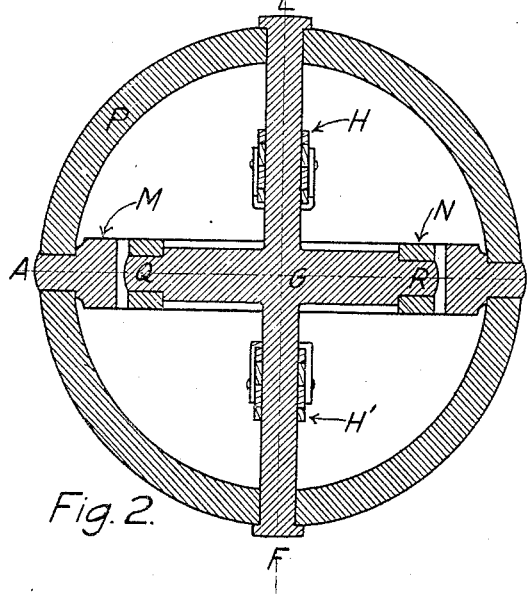
Figure 3:
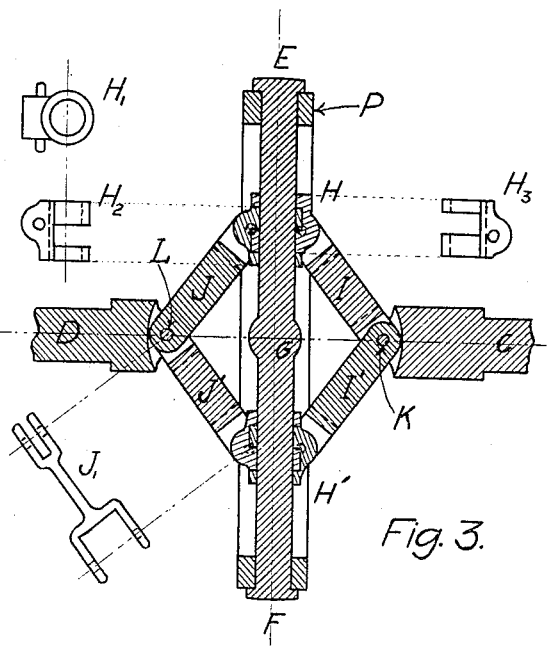
Figure 4:
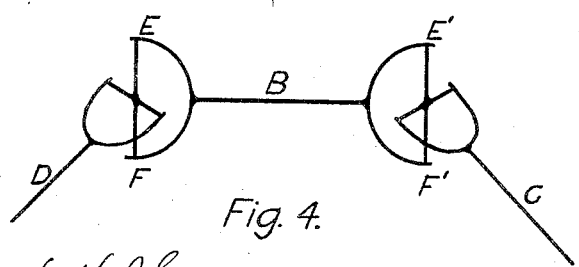
Figure 5:
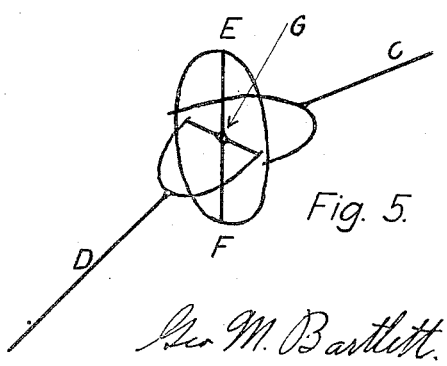

Figure 1 is a horizontal section through the center lines of the shafts C and D; Fig. 2 a vertical section through A B; Fig. 3 a vertical section through the center lines of the shafts C and D, also showing details of the pieces H and J; Fig. 4 represents the universal joint now in common use. Fig. 5 shows the result of shortening the intermediate shaft B (Fig. 4) to zero and bringing E F and E' F' into coincidence.

Similar letters refer to similar parts throughout the several views.

Figs. 1, 2 and 3 show the views of the joint when the shafts are in the same straight line. The yoke M, Fig. 1, turns with the shaft C and articulates with the ring P (Figs. 1 and 2) by means of the trunnions at A and B. The center-line A B of the trunnions (Fig. 1) is perpendicular to the center-line of the shaft C, and intersects it at a point G. A piece E F Q R (Fig. 2) turns on the spindle E F, whose center-line passes through G and is perpendicular to the center-line A B, and also to the center-line of the trunnions Q and R. On these same trunnions turns the yoke N, (Fig. 1), which is fixed to the shaft D, whose center-line is perpendicular to the center-line Q R and intersects it in G, the center of the system. A representation of the relation between these parts is shown in Fig. 5. But in this form the spindle E F can have no determinate motion. To render it determinate, so that a uniform rotation of the driving shaft will give a uniform rotation to the driven shaft while the angle between the shafts varies, it is necessary that the axis E F be constrained to lie always in the plane bisecting the angle between the center-lines of the shafts. I have accomplished this in the following manner: At K and L (Figs. 1 and 3) are lugs projecting from the shafts C and D. These lugs carry pins whose center-lines are equally distant from the center of the system G. A pair of links, I and J, of equal length (Fig. 3) turn on these pins and articulate with a pair of collars at H, these collars being so designed that, while the two are always in juxtaposition, each may turn upon the spindle E F or slide upon it longitudinally. This double collar is then always equidistant from the two shafts, and forces the center-line of the spindle E F to remain in the bisecting plane above mentioned. A pair of links, I' and J', similar to I and J, and attached to similar collars at H', may be added as shown, so that as H approaches G, H' will recede from it. Thus when the action of one pair of links is weakest that of the other is strongest.

I am aware that prior to my invention shaft couplings have been made that have individually accomplished three of the four objects I have mentioned in lines 21 to 31 of this specification; but I believe that none have heretofore accomplished all four objects in connection with the same combination.

I claim as my invention;

In a coupling, the combination of two shafts having yokes and connecting lugs at their ends, a ring connected to one yoke, a cross-piece connected to the other yoke and to the ring, collars adapted to slide on one arm of the cross piece and pairs of links connecting said collars to said lugs, substantially as described.

GEORGE MILLER BARTLETT.

Witnesses:
H. J. GOULDING,
FRANK R. FINCH.